United States Patent
Agarwal et al.

(10) Patent No.: US 9,652,394 B2
(45) Date of Patent: May 16, 2017

(54) SYSTEM AND METHOD FOR MANAGING A CACHE POOL

(71) Applicant: Dell Products L.P., Round Rock, TX (US)

(72) Inventors: Sandeep Agarwal, Bangalore (IN); Anup Atluri, Bangalore (IN); Ashokan Vellimalai, Bangalore (IN); Deepu Syam Sreedhar M, Calicut (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/623,163

(22) Filed: Feb. 16, 2015

(65) Prior Publication Data

US 2016/0239420 A1    Aug. 18, 2016

(51) Int. Cl.
G06F 12/08     (2016.01)
G06F 12/0842   (2016.01)
G06F 12/0871   (2016.01)

(52) U.S. Cl.
CPC ...... G06F 12/0842 (2013.01); G06F 12/0871 (2013.01); *G06F 2212/224* (2013.01); *G06F 2212/62* (2013.01)

(58) Field of Classification Search
CPC .............. G06F 2212/62; G06F 12/0842; G06F 12/0871; G06F 2212/224

USPC ..................... 711/120, 4, 130, 147
See application file for complete search history.

(56) References Cited

U.S. PATENT DOCUMENTS

| | | |
|---|---|---|
| 2014/0047185 A1 | 2/2014 | Peterson et al. |
| 2014/0047193 A1 | 2/2014 | Gross et al. |
| 2014/0052925 A1 | 2/2014 | Kotzur et al. |
| 2014/0188976 A1* | 7/2014 | Plamondon ......... G06F 12/0862 709/202 |
| 2015/0268872 A1* | 9/2015 | Ding ..................... G06F 3/0616 711/103 |
| 2015/0317090 A1* | 11/2015 | Samanta ............. G06F 12/0246 711/103 |
| 2015/0331794 A1* | 11/2015 | Ren .................... G06F 12/0815 709/214 |

* cited by examiner

*Primary Examiner* — Jasmine Song
(74) *Attorney, Agent, or Firm* — Baker Botts L.L.P.

(57) ABSTRACT

In one embodiment, a system includes a processor and a memory communicatively coupled to the processor. The processor is configured to receive a write request associated with a cache pool, which comprises a plurality of disks. The write request comprises data associated with the write request. The processor is additionally configured to select a first disk from the plurality of disks using a life parameter associated with the first disk. The processor is further configured to cause the data associated with the write request to be written to the first disk.

17 Claims, 3 Drawing Sheets

FIG. 1

| Node | Disk | Remaining Life | Current Usage |
|---|---|---|---|
| 102a | A | 60-80% | 20-40% |
| 102a | B | 20-40% | 60-80% |
| 102a | C | <20% | 60-80% |
| 102a | D | 40-60% | >80% |
| 102b | E | 60-80% | >80% |
| 102b | F | 80-100% | 60-80% |
| 102c | G | 20-40% | 40-60% |
| 102c | H | <20% | 0-20% |
| 102c | I | 40-60% | 20-40% |

*FIG. 2A*

| Node | Disk | Priority Score |
|---|---|---|
| 102a | A | 2.2 |
| 102a | B | 4.4 |
| 102a | C | 4.5 |
| 102a | D | 5.3 |
| 102b | E | 5.2 |
| 102b | F | 4.1 |
| 102c | G | 3.4 |
| 102c | H | 1.5 |
| 102c | I | 2.3 |

SYSTEM AND METHOD FOR MANAGING A CACHE POOL

TECHNICAL FIELD

This disclosure relates generally to information handling systems and more particularly to an improved system and method for managing a cache pool.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The concept of caching data in a cache has long been employed in information handling systems. A cache can include a block of memory for temporarily storing data that may be likely to be accessed again. Maintaining a cache of data likely to be accessed again may increase system performance. For example, an information handling system may be coupled to a storage array via a network, but may maintain a storage cache local to the information handling system. Data read from or written to the remote storage array that is likely to be accessed again (e.g., data that is most-recently used and/or most-frequently used) may be stored to the local cache, so that the information handling system can access the cached data from the cache, rather than accessing the data from the remote storage array which may take a longer period of time, due to latency inherent in performing input/output operations over a network.

SUMMARY

In one embodiment, a method includes receiving a write request associated with a cache pool comprising a plurality of disks. The write request comprises data associated with the write request. The method additionally includes selecting a first disk from the plurality of disks using a life parameter associated with the first disk. The method further includes causing the data associated with the write request to be written to the first disk.

In one embodiment, a system includes a processor and a memory communicatively coupled to the processor. The processor is configured to receive a write request associated with a cache pool, which comprises a plurality of disks. The write request comprises data associated with the write request. The processor is additionally configured to select a first disk from the plurality of disks using a life parameter associated with the first disk. The processor is further configured to cause the data associated with the write request to be written to the first disk.

Certain embodiments of the present disclosure may provide one or more technical advantages. The industry has increasingly implemented caches using solid-state storage devices. However, one well-known disadvantage of solid-state storage devices are the limited number of times data can be written to the devices compared to other forms of storage. Solid-state storage devices often employ flash memory. Typically, a cell of a flash-based solid-state storage device can be only be erased (and therefore written) a limited number of times before it fails. Accordingly, over time a sufficient number of cells may fail such that the solid-state storage device may be incapable of writing further data. A technical advantage of one embodiment includes causing disks to wear at approximately the same or a similar rate, reducing or eliminating the risk that one disk may be overused and fail substantially sooner than other disks in the system (e.g., one disk receives 1%, 2%, 5%, or 10% more writes to it than the other disks in the system). Another technical advantage of one embodiment includes reducing the cost of replacing disks that fail substantially earlier than others in system.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

Reference is now made to the following description taken in conjunction with the accompanying drawings, wherein like reference numbers represent like parts.

DETAILED DESCRIPTION

Figure 1:
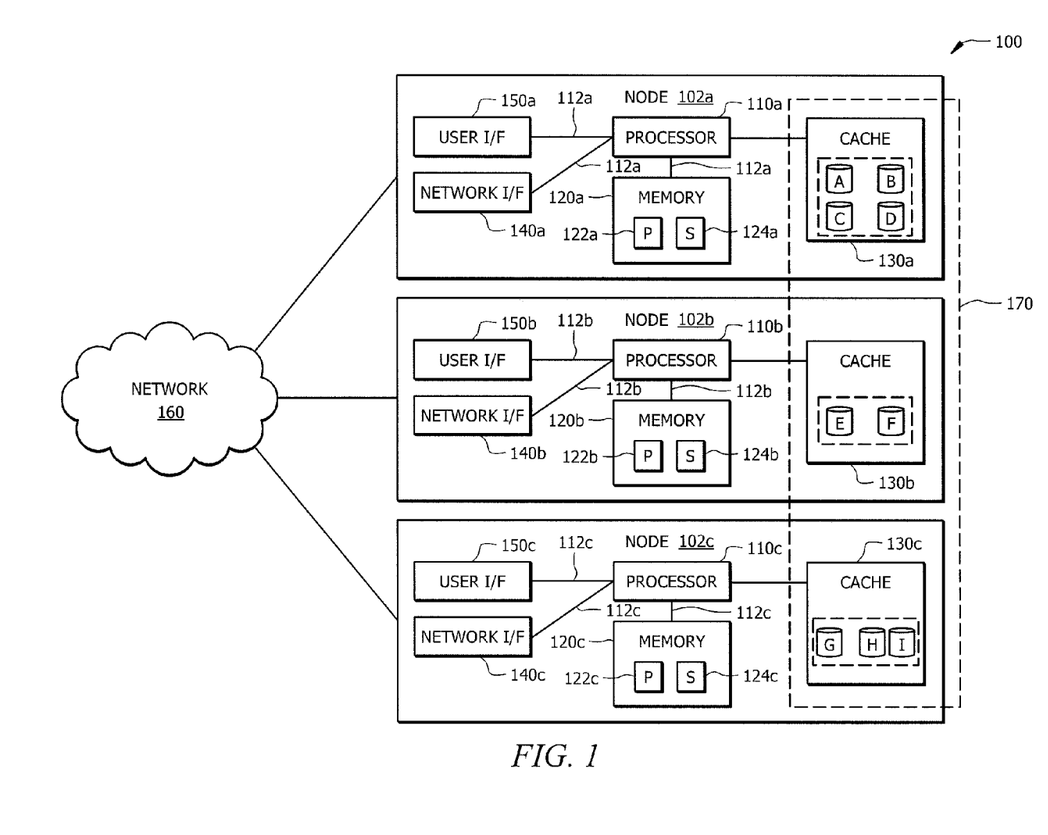
FIG. 1 is a block diagram of an example of an information handling system in accordance with some embodiments of the present disclosure.

FIG. 1 illustrates a block diagram of an example of information handling system 100 in accordance with some embodiments of the present disclosure. In particular embodiments, system 100 may include one or more nodes 102a-c that are coupled to network 160. Node 102a includes cache 103a, node 102b includes cache 130b and node 102c includes cache 103c. Caches 103a-c each include a plurality of disks and are included in cache pool 170. Nodes 102a-c may also include memory modules 120a-c. Memory modules 120a-c may include parameters 122a-c, which may include information about disks in caches 130a-130c. For example, a life parameter may how many times data may be written to a disk and a usage parameter may represent the available storage space remaining on disk. Memory modules 120a-c may further include priority scores 124a-c, which scores each disk in cache pool 170 based on parameters 122a-c associated with the disks to select a disk that the system should write data to. System 100 is configured to receive a write request associated with cache pool 170, select a first disk from cache pool 170 using a life parameter (e.g., one of parameters 122a-c) associated with the first disk, and cause the data associated with the write request to be written to the first disk.

Nodes 102a-c, in some embodiments, may comprise a server sled, a server module, a server node, a server blade, or any suitable structure capable of housing node components. Nodes 102a-c may comprise processors 110a-c, memory modules 120a-c, caches 130a-c, user interfaces 150a-c, and network interfaces 140a-c. It should be understood that the particular illustrated components of each node 102a-c are examples only and that additional, fewer, and/or alternative components may be present. For example, each node 102a-c may include multiple processors 110a-c or memory modules 120a-c.

In particular embodiments, user interfaces 150a-c include hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable user interfaces 150 for them. Where appropriate, user interfaces 150a-c may include one or more device or software drivers enabling processors 110a-c to drive one or more of these I/O devices. Although this disclosure describes and illustrates a particular user interface, this disclosure contemplates any suitable user interface.

Network interfaces 140, in some embodiments, include hardware, software, or both providing one or more interfaces for communication (such as, for example, packet-based communication) between information handling system 100 and one or more other information handling systems 100 or one or more networks. As an example and not by way of limitation, network interface 140 may include a network interface controller or card (NIC) or network adapter for communicating with an Ethernet or other wire-based network or a wireless NIC (WNIC) or wireless adapter for communicating with a wireless network, such as a WI-FI network. This disclosure contemplates any suitable network and any suitable network interface 140 for the network. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable network interfaces 140a-c for any of these networks, where appropriate. Although this disclosure describes and illustrates a particular network interface, this disclosure contemplates any suitable communication interface.

In particular embodiments, buses 112a-c include hardware, software, or both coupling components of information handling system 100 to each other. As an example and not by way of limitation, buses 112a-c may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Although this disclosure describes and illustrates a particular bus, this disclosure contemplates any suitable bus or interconnect.

Processors 110a-c, in some embodiments, may comprise any system, device, or apparatus operable to interpret and/or execute program instructions and/or process data. Processors 110a-c may include one or more: microprocessors, microcontrollers, digital signal processors (DSP), graphical processing units (GPU), application specific integrated circuits (ASIC), or another digital or analog circuitry configured to interpret and/or execute program instructions and/or process data. In some embodiments, processors 110a-c may interpret and/or execute program instructions and/or process data stored locally (e.g., in memory modules 120a-c). In the same or alternative embodiments, processors 110a-c may interpret and/or execute program instructions and/or process data stored remotely. This disclosure contemplates processors 110a-c including any suitable number of any suitable internal registers, where appropriate. Where appropriate, processors 110a-c may include one or more arithmetic logic units (ALUs); be a multi-core processor; or include one or more processors 110. Although this disclosure describes and illustrates a particular processor, this disclosure contemplates any suitable processor.

Caches 130a-c, in some embodiments, may comprise any system, device, or apparatus operable to facilitate access to data stored in a storage system (e.g., a file system, a database, a hard drive, or other suitable storage systems). In particular embodiments, caches 130a-c are operable to store copies of such data so that such data may be accessed faster through caches 130a-c than by accessing the storage system which stores such data. Caches 130a-c may be communicatively coupled to processors 110a-c. For example, caches 130a-c may be physically within nodes 102a-c and may be coupled to processors 110a-c using buses 112a-c. As another example, caches 130a-c may be physically stored in a separate location and may be communicatively coupled to processors 110a-c through an internal network. Caches 130a-c may include one or more disks. Disks, in some embodiments, may comprise solid state drives (SSDs) or any drive operable to store information associated with a write request. Caches 130a-c may include any number of disks. For example, cache 130a may comprise four disks (disk A, disk B, disk C, and disk D); cache 130b may comprise two disks (disk E and disk F); and cache 130c may comprise three disks (disk G, disk H, and disk I). Although illustrated with a specific number of disks, system 100 may include any number of disks within caches 130a-c.

In some embodiments, nodes 102a-c may cause data to be written to a disk in either a local cache or a remote cache. In some embodiments, a local cache may be physically stored within nodes 102a-c and/or may be located on the same internal network as a host node (e.g., 102a). Each of nodes 102a-c may have access to one or more local caches and one or more remote caches. For example, cache 130a may be a local cache to node 102a and a remote cache to nodes 102b and 102c. As another example, cache 130b may be a local cache to node 102b and a remote cache to nodes 102a and 102c. As an additional example, cache 130c may be a local cache to node 102c and a remote cache to nodes 102a and 102b. All caches 130a-c that are available for processors 110a-c to cause data to be written on may comprise cache pool 170. Although this disclosure describes an illustrates a particular number of caches 130a-c, system 100 may include any number of caches.

Memory modules 120a-c may, in various embodiments, comprise any system, device, or apparatus operable to retain and/or retrieve program instructions and/or data (e.g., computer-readable media). Memory modules 120a-c may comprise one or more modules; such modules can include random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down. In some embodiments memory modules 120a-c may be implemented using any of these techniques, including techniques different from each other. In some embodiments, memory modules 120a-c comprise parameters 122a-c and priority scores 124a-c.

Figure 2A:
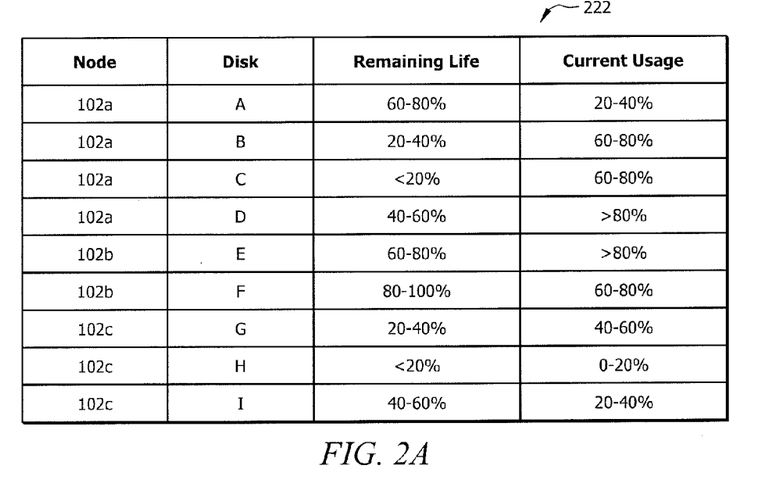
FIG. 2A illustrates an example of a database comprising a set of parameters associated with nodes in the information handling system of FIG. 1.

Parameters 122a-c, in some embodiments, may include any number of parameters associated with the disks in caches 130a-c and indicating characteristics and/or properties of disks. Parameters 122a-c, in some embodiments, may include a life parameter, which may represent the number of times data has been written to disk, the remaining number of times data can be written to disk, or any information indicating when disk is likely to fail. Disks, in some embodiments, may comprise SSDs that may be rated and marketed according to a maximum program and erase (P/E) cycles, known as the endurance rating (e.g., 5K, 10K, 100K). Because SSDs have a limited predetermined life (e.g., number of P/E cycles available), a life parameter may track the remaining write life (e.g., number of P/E cycles) available. The life parameter of each disk may be represented in any suitable format, for example, as a number of remaining cycles or a percentage of remaining life. Life parameters for each disk may be stored in memory modules 120a-c in any suitable format (e.g., as a table, matrix, or database). Parameters 122a-c, in some embodiments, may also include usage parameters for disks. Usage parameter may represent the available storage space remaining on disk. The usage parameter of each disk may be presented in any suitable format, for example, as a percentage of space currently used on disk, as a percentage of space available on disk, as a value of space available on disk, or as a value of space used on disk. Usage for each disk may be stored in memory modules 120a-c in any suitable format (e.g., in a table, matrix, or database). FIG. 2A illustrates database 222 indicating life parameters and usage parameters for each disk in cache pool 170. Processors 110a-c may access parameters 122a-c in memory modules 120a-c when selecting a first disk to cause data to be written to, as described below. By utilizing the life parameter when selecting a disk to write to, processors 110a-c may reduce or eliminate the risk that one of disks may be written to more frequently than other disks in various embodiments. By seeking to have the life parameters among all disks in cache pool 170 be similar to each other, processors 110a-c may allow for a more even distribution of remaining life among disks. This can reduce or eliminate the risk that one disk may fail substantially sooner than other disks (e.g., one disk may receive 10% more writes than other disks). This can increase the life of caches 130a-c without significantly impacting the performance of caches 130a-c.

Figure 2B:
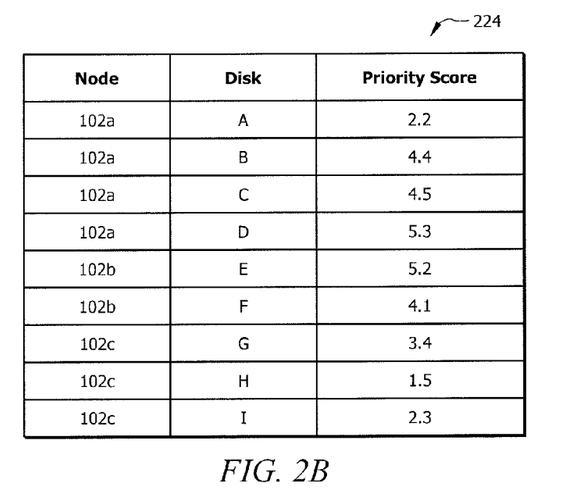
FIG. 2B illustrates an example of a database comprising a set of priority scores associated with nodes in the information handling system of FIG. 1.

Priority scores 124, in some embodiments, may comprise a score for each of the plurality of disks in cache pool 170. Priority scores 124a-c may indicate which disk has the highest priority, and thus which disk processors 110a-c should select to cause data from a write request to be written on. Priority scores 124a-c may be calculated by processors 110a-c using parameters 122a-c. For example, processors 110a-c may determine a first priority based on a disk's current life parameter value, determine a second priority based on a disk's current usage parameter value, and combine these priorities to calculate a priority score. An administrator of system 100 may determine the priority associated with each parameter value. FIG. 2B illustrates database 224 indicating priority scores 124a-c for each disk in cache pool 170. Processors 110a-c may access priority scores 124a-c in memory modules 120a-c when selecting a first disk to cause data to be written to, as described below.

In one example of operation of information handling system 100, user interface may receive a write request from a user or administrator of system 100. Processors 110a-c may determine a life parameter of one or more disks in the local cache (e.g., cache 130a for processor 110a) and in one or more remote caches (e.g., caches 130b and 130c). Processors 110a-c may calculate priority scores 124a-c for each disk of cache pool 170 and select the disk with the highest priority. Processors 110a-c then causes the data associated with the write request to be written to the disk with the highest priority.

In some embodiments, processors 110a-c receive parameters 122a-c associated with a plurality of disks. Parameters 122a-c may comprise a life parameter, a usage parameter, and any other parameters associated with a disk. In some embodiments, processors 110a-c may receive parameters 122a-c in different ways. For example, each time processors 110a-c receive a write request, processors 110a-c may request parameters from disks in a local cache (e.g., 130b for processor 110b) and communicate with processors 110a and 110c to receive parameters 122a-c from disks in remote caches (e.g., 130c and 130a). As another example, processors 110a-c may receive parameters 122a-c on a regular time interval (for example, hourly, daily, weekly, or monthly). Processors 110a-c may also receive parameters 122a-c each time that data is written to one of disks A-I in cache pool 170 (e.g., any time a parameter value changes or is updated). In some embodiments, processors 110a-c may receive priority scores 124a-c when receiving parameters 122a-c. In some embodiments, processors 110a-c may receive parameters 122a-c and may calculate priority scores 124a-c itself.

In some embodiments, processors 110a-c calculate a priority score for the plurality of disks using one or more parameters from parameters 122a-c associated with the plurality of disks. Processors 110a-c may refer to a priority matrix to determine priority scores 124a-c. An example of the priority matrix that may be used to calculate priority scores for each disk is shown in Table 1 below.

TABLE 1 priority matrix

| Life parameter | User-Defined Priority | Usage Parameter | User-Defined Priority |
|---|---|---|---|
| 80-100% | .1 | 80-100% | 5 |
| 60-80% | .2 | 60-80% | 4 |
| 40-60% | .3 | 40-60% | 3 |
| 20-40% | .4 | 20-40% | 2 |
| 0-20% | .5 | 0-20% | 1 |

As shown in Table 1, life parameter may be indicated as a percentage of remaining life of a disk. As the remaining life increases (high percentage), the user-defined priority assigned to the range decreases, corresponding to a higher priority. For example, if a disk has 100% remaining write life, then it would receive a priority of 0.1, indicating that it should be selected above other disks. As shown in Table 1, usage parameter may be indicated as a percentage of space used on a disk. As the usage increases (high percentage), the user-defined priority assigned to the range increases, corresponding to a lower priority. For example, if a disk has used 98% of its current space, the disk would receive a priority of 5, indicating that it should not be selected above other disks due to the low space available. Table 1 represents an example of the priorities that may be assigned based on the values of the various parameters associated with a disk. Administrator of system 100 may define the priorities in any suitable manner.

Processors 110*a-c* may use parameters 122*a-c* and a priority matrix (an example of which is shown above in Table 1) in order to calculate priority scores 124*a-c* for each disk. Referring to FIG. 2A, using database 222, which shows parameter values for the disks in cache pool 170, processors 110*a-c* may calculate priority scores 124*a-c*. For example, disk A has a life parameter value of 60-80%, which corresponds to a priority of 0.2 based on priority matrix in Table 1 above. Disk A has a usage parameter of 20-40%, which corresponds to a priority of 2 based on priority matrix in Table 1 above. Processors 110*a-c* may then combine the two priorities from each parameter to determine the priority score. Processors 110*a-c* may combine the two priorities through multiplication, addition, averaging, or any suitable operation to determine the priority score. Continuing the example from above, processors 110*a-c* may add the life parameter priority of 0.2 to the usage parameter priority of 2.0 to determine a priority score of 2.2 for disk A. FIG. 2B illustrates an example of priority score matrix 224, which shows the calculated priority scores 124*a-c* for the disks in cache pool 170.

In some embodiments, processors 110*a-c* determine a disk with the greatest priority in cache pool 170. In some embodiments, processors 110*a-c* may determine the disk with the lowest priority score (e.g., closest to 0), to determine the disk with the highest priority. Continuing the example from above and referring to FIG. 2B, disk A may have the lowest priority score of the disks in local cache 130*a*. Disk A has lower priority scores than disks B, C, and D because it has a large percentage of remaining life (as indicated by its life parameter of 60-80%) and a low current usage percentage (as indicated by its usage parameter of 20-40%), resulting in a low priority score of 2.2

In some embodiments, processors 110*a-c* may determine that writing to a disk in a local cache (e.g., 130*c* for node 102*c*) is preferred to writing to a disk in a remote cache (e.g., 130*a* for node 102*c*). If a local cache is preferred, processors 110*a-c* may select one of the disks in the local cache even if a disk in a remote cache has a higher priority. For example, referring to database of priority scores 224 illustrated in FIG. 2B, processor 110*a* (of node 102*a*) may select disk A as the disk to use for a write request even though disk H of node 102*c* has a lower priority score, and thus a higher priority. In some embodiments, processors 110*a-c* may determine that a local cache is not preferred. For example, processors 110*a-c* may select disk H as the disk with the greatest priority based on its score of 1.5, which is the lowest score listed in database 224, indicating that it has the highest priority.

For the purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device, and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communication between the various hardware components.

This disclosure contemplates any suitable number of information handling systems 100. Where appropriate, information handling system 100 may include one or more information handling systems 100, be unitary or distributed, span multiple locations, span multiple machines, span multiple data centers, or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate. Although this disclosure describes and illustrates a particular information handling system having a particular number of particular components in a particular arrangement, this disclosure contemplates any suitable information handling system having any suitable number of any suitable components in any suitable arrangement.

For the purposes of this disclosure, computer-readable media may include any instrumentality or aggregation of instrumentalities that may retain data and/or instructions for a period of time. Computer-readable media may include, without limitation, storage media, such as a direct access storage device (e.g., a hard disk drive or floppy disk); a sequential access storage device (e.g., a tape disk drive); a compact disk; CD-ROM; DVD; random access memory (RAM); read-only memory (ROM); electrically erasable programmable read-only memory (EEPROM); solid state drives (SSDs) such as Single Level Cell (SLC), Multi Level Cell (MLC), enterprise MLC (eMLC), and/or flash memory; as well as communications media, such as wires, optical fibers, microwaves, radio waves, and other electromagnetic and/or optical carriers; and/or any combination of the foregoing.

Modifications, additions, or omissions may be made to the systems described herein without departing from the scope of the disclosure. For example, information handling system 100 may include any number of nodes 102a-c, cache pools 170, and networks 160. The components may be integrated or separated. Moreover, the operations may be performed by more, fewer, or other components. Additionally, the operations may be performed using any suitable logic comprising software, hardware, and/or other logic.

Figure 3:
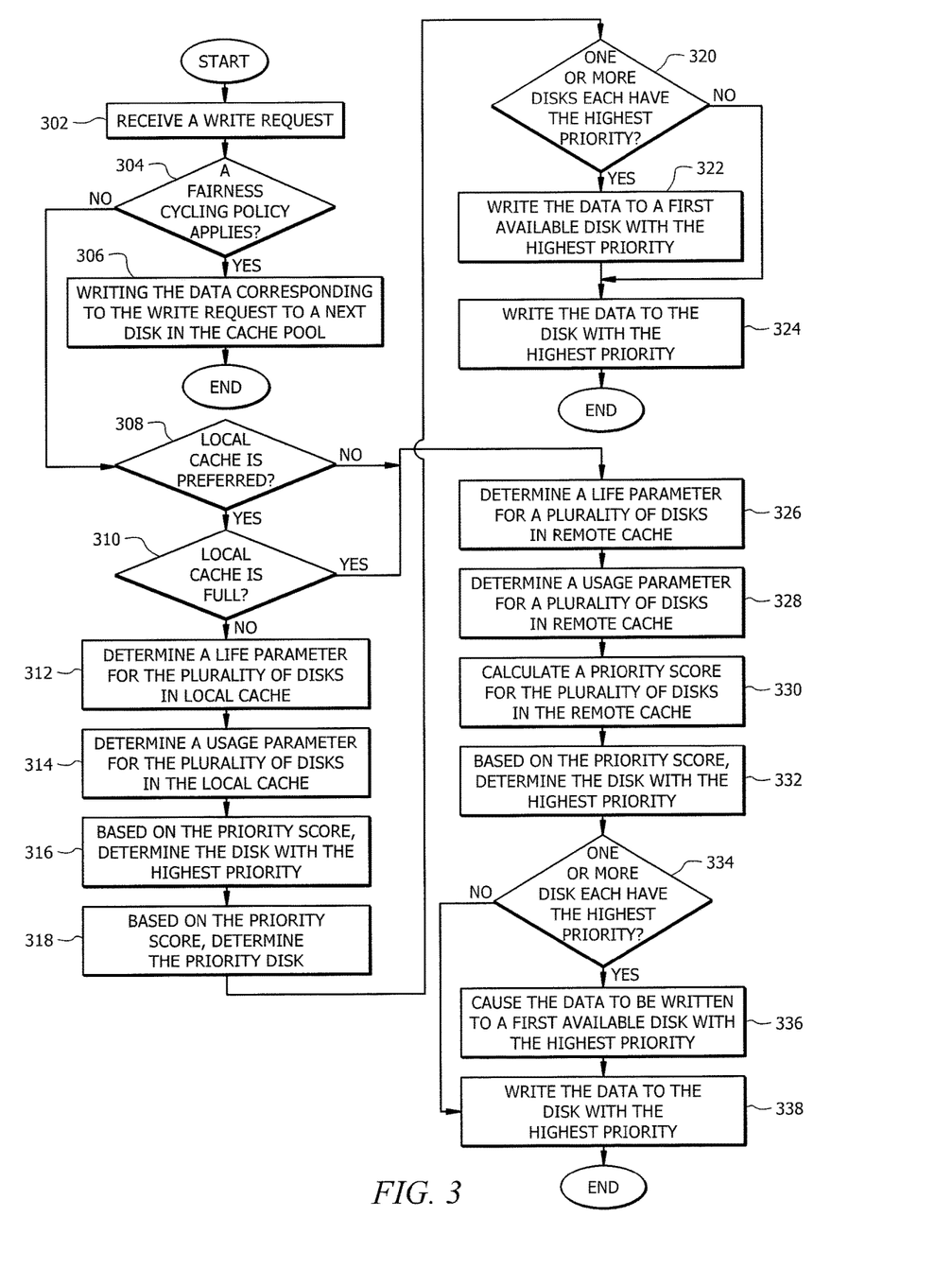
FIG. 3 is a flowchart describing an example of managing a cache pool.

FIG. 3 is a flowchart describing an example of managing a cache pool by system 100 of FIG. 1. At step 302, in some embodiments, processor 110a may receive a write request from user interface 150a. The write request may have data associated with it to be written to one or more of the disks of cache pool 170.

At step 304, in some embodiments, processor 110a determines whether a fairness cycling policy applies. A fairness cycling policy may be a policy that writes data to each disk based on a predetermined rotation of the disks (e.g., the disks may be written to in a sequence). If a fairness cycling policy applies, step 306 may be performed and if a fairness cycling policy does not apply, step 308 may be performed. If processor 110a determines that a fairness cycling policy applies in step 304, then processor 110a writes the data corresponding to the write request received in step 302 to a next disk in cache pool 170 at step 306. For example, using a fairness cycling policy, processor 110a may determine a next disk by determining which disk is next in the predetermined rotation of the disks. As another example, if the local cache is preferred, processor 110 may determine a next disk by determining which disk of the disks in the local cache is next in the predetermined rotation of the disks. After writing the data to the next disk in step 306, the method ends.

If processor 110a determines at step 304 that a fairness cycling policy does not apply, processor 110a determines whether the local cache is preferred at step 308, in some embodiments. If the local cache is preferred, step 310 may be performed and if a local cache is not preferred, step 326 may be performed. In some embodiments, a user or administrator of system 100 may select a setting that the local cache is preferred. For example, for processor 110a, local cache may comprise cache 130a, including disks A, B, C and D. In some embodiments, processor 110a may perform step 308, determining whether the local cache is preferred, prior to step 304, determining whether a fairness cycling policy applies. For example, processor 110a may determine that a local cache is preferred, determine that a fairness cycling policy applies, and write the data corresponding to the write request to a next disk in the local cache pool. As another example, processor 110 may determine that a local cache is not preferred, determine that a fairness cycling policy applies, and write the data corresponding to the write request to a next disk in the remote cache pool.

At step 310, in some embodiments, processor 110a determines whether the local cache, for example, cache 130a, is full. Processor 110a may determine the usage of each of the disks by polling the disks within cache 130a to determine whether any of the disks in cache 130a contain available space. Processor 110a may access the stored parameters 122a in memory module 120a that may include a database of usage parameters for each disk in cache 130a. FIG. 2A illustrates an example of database 222 storing parameters 122a. If processor 110a determines that a local cache is full in step 310, step 326 may be performed in which processor 110a examines the disks of remote caches (e.g., caches 130b and 130c). If processor 110a determines that the local cache is not full (e.g., at least one of the disks in cache 130a has a current usage less than 100% or otherwise has sufficient capacity to store information associated with the write request), step 312 may be performed.

At step 312, in some embodiments, processor 110a determines life parameters for the plurality of disks in the local cache. Processor 110a may determine the life parameter for the plurality of disks, such as disks A, B, C, and D, in any number of ways. For example, processor 110a may poll each of the disks within cache 130a to determine the life parameters. As another example, processor 110a may access memory modules 120a-c that store parameters 122a. An example of parameters 122a is depicted in FIG. 2A in matrix 222.

At step 314, in some embodiments, processor 110a determines usage parameters for the plurality of disks in cache 130a. Processor 110a may determine the usage parameters by polling the disks and/or by accessing parameters 122a in memory 120a, similar to the technique that processor 110a uses to determine the life parameters at step 312.

At step 316, in some embodiments, processor 110a calculates priority scores for the plurality of disks in local cache 130a. Processor 110a may calculate priority scores 124a using the life parameters and the usage parameters determined at steps 312 and 314, respectively. For example, processor 110a may calculate the priority score of disk B in local cache 130a as 4.4. Disk B may have a remaining life parameter of 20-40% and a current usage parameter of 60-80%, as shown database 222 of FIG. 2A. Processor 110a may use any suitable scoring technique to associate a score with life parameter and usage parameter. For example, a priority associated with a 20-40% life parameter may be 0.4 and a priority associated with usage parameter 60-80%, may be 4.0 (as illustrated above in Table 1). Continuing the example, processor 110a may add the life parameter priority (0.4) and the usage parameter priority (4.0) to determine the priority score of disk B as 4.4. Processor 110a may use any suitable scoring technique and associate any suitable priorities with certain parameter values. An example of priority scores associated with each life parameter and usage parameter is shown in Table 1 above. In some embodiments, processor 110a may calculate the priority score for each of the disks in cache pool 170, for example a priority score for each of disks A, B, C, D, E, F, G, H, and I. An example of priority scores database 224 that may be stored in memory 120a is illustrated in FIG. 2B.

At step 318, in some embodiments, processor 110a determines a disk with the greatest priority based on priority scores 124a of the disks. Processor 110a may compare priority scores 124a for each disk (e.g., disks A, B, C, D) to determine which disk has the highest priority. Continuing the example from above, disk A may have a priority score of 2.2, disk B may have a priority score of 4.4, disk C may have a priority score of 4.5 and disk D may have a priority score of 5.3. In this example, processor 110a may select disk A as the disk with the lowest priority score, which corresponds with the highest priority disk.

At step 320, in some embodiments, processor 110a determines whether one or more disks each have the highest priority. For example, if disk A has a priority of 2.2, disk B has a priority of 4.4, disk C has a priority of 2.2, and disk D has a priority of 5.3, then disk A and disk C both have the same priority score of 2.2. Because 2.2 is the lowest priority score of the disks in local cache 130a (which corresponds to the highest priority), processor 110a may determine that more than one disk has the highest priority. If at step 320 processor 110a determines that one or more disks have the highest priority, for example, disk A and disk C having the same priority score of 2.2, then processor 110a may write the data to a first available disk with the highest priority in step 322. Processor 110a may determine the first available disk by determining which disk is next in the predetermined rotation of the disks. If at step 320, processor 110a determines that only one disk has the highest priority (e.g., disk A's priority score of 2.2 results in it having the highest priority), then processor 110a, at step 324, writes the data associated with the write request received in step 302 to disk A in various embodiments. After writing the data either to the first available disk in step 322 or to the disk with the greatest priority in step 324, the method ends.

If processor 110a determines that the local cache is not preferred in step 308, or that the local cache is full in step 310, the method continues to step 326. At step 326, in some embodiments, processor 110a determines a life parameter for a plurality of disks in a remote cache. A remote cache may be any cache that is not located on node 102a. For example, referring to FIG. 1, cache 130b and cache 130c would be remote caches to node 102a. At step 328, in some embodiments, processor 110a may determine a usage parameter for the plurality of disks in the remote cache. For example, processor 110a may communicate with processors 110b and 110c about caches 130b and 130c through network 160. In some embodiments, determining life and usage parameters of a plurality of disks in steps 326 and 328 can be performed using one or more of the techniques discussed above with respect to steps 312-314.

At step 330, in some embodiments, processor 110a may calculate priority scores for the plurality of disks in the remote cache. For example, processor 110a may determine that disk E of remote cache 130b has a priority score of 5.2 and that disk F of remote cache 130b has a priority score of 4.1. Processor 110a may further determine the priority scores of the disks located in cache 130c. For example, disk G may have a priority score of 3.4, disk H may have a priority score of 1.5 and disk I may have a priority score of 1.3. In some embodiments, calculating a priority score for the disks in remote caches in step 330 can be performed using one or more of the techniques discussed above with respect to step 316.

At step 332, in some embodiments, processor 110a may determine the disk with the greatest priority based on the priority scores calculated in step 330. Continuing the example from above, processor 110a may determine that Disk H has the lowest priority score of the disks in the remote caches 130b and 130c, and thus that Disk H has the highest priority. In some embodiments, determining the disk with the greatest priority in step 332 can be performed using one or more techniques discussed above with respect to step 318.

In some embodiments, processor 110a determines whether one or more disks each have the highest priority in step 334. Determining whether one or more disks each have the highest priority in step 334 can be performed using one or more of the techniques discussed above with respect to step 320. Continuing the example from above, processor 110a may determine that only one disk has the highest priority (e.g., Disk H with a priority score of 1.5). If processor 110a determines that only one disk has the highest priority, then processor 110a causes the data to be written to the selected disk with the greatest priority (e.g., disk H) in step 338. Processor 110a may send a message to network interface 140c through network interface 140a via network 160 so that processor 110c may write the data to disk H located in cache 130c. If, at step 334, processor 110a determines that at least two disks have the highest priority, processor 110a causes the data from the write request to be written to a first available disk with the highest priority in step 336 in some embodiments. For example, if disk E has a priority score of 1.5 and disk H has a priority score of 1.5, resulting in both of them having the highest priorities of the disks in cache pool 170, then processor 110a may select disk E as the first available disk. After processor 110a causes the data to be written to either the first available disk with the highest priority in step 336 or to the selected disk to use for a write request in step 338, the method ends.

Modifications, additions, or omissions may be made to the methods described in FIG. 3 without departing from the scope of the disclosure. For example, the steps may be combined, modified, or deleted where appropriate, and additional steps may be added. For example, processors 110a-c may determine the disk with the greatest priority in step 318 based on the life parameters of the disks. In this example, steps 314 and 316, which determine usage parameters and calculate priority scores may be omitted. Additionally, the steps may be performed in any suitable order without departing from the scope of the present disclosure. While discussed as processors (e.g., 110a, 110b, and 110c) and their components performing the steps, any suitable component of information handling system 100 may perform one or more of the steps.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method comprising:
   receiving a write request associated with a cache pool comprising a plurality of disks, the write request comprising data associated with the write request;
   selecting a first disk from the plurality of disks based on a life parameter and a usage parameter associated with the first disk, wherein the usage parameter indicates the amount of available space on the first disk; and
   causing the data associated with the write request to be written to the first disk calculating a priority score for the plurality of disks using the life parameters associated with the plurality of disks; based on the priority score, determining a disk with the greatest priority; and wherein selecting the first disk from the plurality of disks comprises selecting the disk with the greatest priority.

2. The method of claim 1, wherein the cache pool is a local cache and, the method further comprising:
   determining that the local cache is preferred;
   determining that each disk in the local cache is full;
   receiving a set of parameters associated with a plurality of disks in a remote cache, the set of parameters comprising the life parameter;
   calculating a priority score for the plurality of disks in the remote cache using the life parameters associated with the plurality of disks in the remote cache;

based on the priority score, determining a disk with the greatest priority, the disk with the greatest priority having a highest priority of the plurality of disks in the remote cache;

determining that at least two disks of the plurality of disks in the remote cache each have the highest priority;

wherein selecting the first disk from the plurality of disks comprises selecting a first available disk of the at least two disks of the plurality of disks in the remote cache with the highest priority; and wherein causing the data associated with the write request to be written to the first disk comprises causing the data associated with the write request to be written to the first available disk.

3. The method of claim 1, further comprising:

determining that at least two disks of the plurality of disks each have the highest priority;

wherein selecting the first disk from the plurality of disks comprises selecting a first available disk of the at least two disks of the plurality of disks with the highest priority; and wherein causing the data associated with the write request to be written to the first disk comprises causing the data associated with the write request to be written to the first available disk with the highest priority.

4. The method of claim 1, wherein the cache pool is a local cache and, the method further comprising:

determining whether the local cache is preferred;

determining whether each disk in the local cache is full;

if the local cache is preferred and each disk in the local cache is not full, then selecting the first disk based on the life parameter and the usage parameter comprises selecting a local disk based on the life parameter and the usage parameter, the local disk being in the local cache; and if the local cache is preferred and each disk in the local cache is full, then selecting the first disk based on the life parameter and the usage parameter comprises selecting a remote disk based on the life parameter and the usage parameter, the remote disk being in a remote cache.

5. The method of claim 1, further comprising:

receiving a second write request associated with the cache pool;

determining that a fairness cycling policy applies;

in response to determining that the fairness cycling policy applies, selecting a second disk, the second disk identified using the fairness cycling policy; and causing the data corresponding to the write request to be written to the second disk.

6. The method of claim 1, further comprising:

receiving a set of parameters associated with a plurality of disks, the set of parameters comprising the life parameter and the usage parameter; and updating the set of parameters for each of the plurality of disks using the received set of parameters.

7. An information handling system, comprising:

a memory;

a processor communicatively coupled to the memory, the processor configured to:

receive a write request associated with a cache pool comprising a plurality of disks, the write request comprising data associated with the write request;

select a first disk from the plurality of disks based on a life parameter and a usage parameter associated with the first disk, wherein the usage parameter indicates the amount of available space on the first disk; and cause the data associated with the write request to be written to the first disk calculating a priority score for the plurality of disks using the life parameters associated with the plurality of disks; based on the priority score, determining a disk with the greatest priority; and wherein selecting the first disk from the plurality of disks comprises selecting the disk with the greatest priority.

8. The system of claim 7, wherein the cache pool is a local cache and, the processor is further configured to:

determine that the local cache is preferred;

determine that each disk in the local cache is full;

receive a set of parameters associated with a plurality of disks in a remote cache, the set of parameters comprising the life parameter;

calculate a priority score for the plurality of disks in the remote cache using the life parameters associated with the plurality of disks in the remote cache;

based on the priority score, determine a disk with the greatest priority, the disk with the greatest priority having a highest priority of the plurality of disks in the remote cache;

determine that at least two disks of the plurality of disks in the remote cache each have the highest priority;

wherein selecting the first disk from the plurality of disks comprises selecting a first available disk of the at least two disks of the plurality of disks in the remote cache with the highest priority; and wherein causing the data associated with the write request to be written to the first disk comprises causing the data associated with the write request to be written to the first available disk.

9. The system of claim 7, wherein the processor is further configured to:

determine that at least two disks of the plurality of disks each have the highest priority;

wherein selecting the first disk from the plurality of disks comprises selecting a first available disk of the at least two disks of the plurality of disks with the highest priority; and wherein causing the data associated with the write request to be written to the first disk comprises causing the data associated with the write request to be written to the first available disk with the highest priority.

10. The system of claim 7, wherein the cache pool is a local cache and, the processor is further configured to:

determine whether the local cache is preferred;

determine whether each disk in the local cache is full;

if the local cache is preferred and each disk in the local cache is not full, then selecting the first disk based on the life parameter and the usage parameter comprises selecting a local disk based on the life parameter and the usage parameter, the local disk being in the local cache; and if the local cache is preferred and each disk in the local cache is full, then selecting the first disk based on the life parameter and the usage parameter comprises selecting a remote disk based on the life parameter and the usage parameter, the remote disk being in a remote cache.

11. The system of claim 7, wherein the processor is further configured to:

receive a second write request associated with the cache pool;

determine that a fairness cycling policy applies;

in response to determining that the fairness cycling policy applies, select a second disk, the second disk identified using the fairness cycling policy; and cause the data corresponding to the write request to be written to the second disk.

12. The system of claim 7, wherein the processor is further configured to:

receive a set of parameters associated with a plurality of disks, the set of parameters comprising the life parameter and the usage parameter; and update the set of parameters for each of the plurality of disks using the received set of parameters.

13. A non-transitory computer-readable medium including computer-executable instructions encoded in the computer-readable medium, the instructions, when executed by a processor, operable to:

receive a write request associated with a cache pool comprising a plurality of disks, the write request comprising data associated with the write request;

select a first disk from the plurality of disks based on a life parameter and a usage parameter associated with the first disk, wherein the usage parameter indicates the amount of available space on the first disk; and cause the data associated with the write request to be written to the first disk calculating a priority score for the plurality of disks using the life parameters associated with the plurality of disks; based on the priority score, determining a disk with the greatest priority; and wherein selecting the first disk from the plurality of disks comprises selecting the disk with the greatest priority.

14. The computer-readable medium of claim 13, wherein the cache pool is a local cache and the computer-executable instructions, when executed by a processor, are further operable to:

determine that the local cache is preferred;

determine that each disk in the local cache is full;

receive a set of parameters associated with a plurality of disks in a remote cache, the set of parameters comprising the life parameter;

calculate a priority score for the plurality of disks in the remote cache using the life parameters associated with the plurality of disks in the remote cache;

based on the priority score, determine a disk with the greatest priority, the disk with the greatest priority having a highest priority of the plurality of disks in the remote cache;

determine that at least two disks of the plurality of disks in the remote cache each have the highest priority;

wherein selecting the first disk from the plurality of disks comprises selecting a first available disk of the at least two disks of the plurality of disks in the remote cache with the highest priority; and wherein causing the data associated with the write request to be written to the first disk comprises causing the data associated with the write request to be written to the first available disk.

15. The computer-readable medium of claim 13, the computer-executable instructions, when executed by a processor, further operable to:

determine that at least two disks of the plurality of disks each have the highest priority;

wherein selecting the first disk from the plurality of disks comprises selecting a first available disk of the at least two disks of the plurality of disks with the highest priority; and wherein causing the data associated with the write request to be written to the first disk comprises causing the data associated with the write request to be written to the first available disk with the highest priority.

16. The computer-readable medium of claim 13, wherein the cache pool is a local cache and the computer-executable instructions, when executed by a processor, are further operable to:

determine whether the local cache is preferred;

determine whether each disk in the local cache is full;

if the local cache is preferred and each disk in the local cache is not full, then selecting the first disk based on the life parameter and the usage parameter comprises selecting a local disk based on the life parameter and the usage parameter, the local disk being in the local cache; and if the local cache is preferred and each disk in the local cache is full, then selecting the first disk based on the life parameter and the usage parameter comprises selecting a remote disk based on the life parameter and the usage parameter, the remote disk being in a remote cache.

17. The computer-readable medium of claim 13, the computer-executable instructions, when executed by a processor, further operable to:

receive a second write request associated with the cache pool;

determine that a fairness cycling policy applies;

in response to determining that the fairness cycling policy applies, select a second disk, the second disk identified using the fairness cycling policy; and cause the data corresponding to the write request to be written to the second disk.

* * * * *